United States Patent [19]
Berkowitz et al.

[11] Patent Number: 5,434,017
[45] Date of Patent: Jul. 18, 1995

[54] ISOLATED CONNECTION FOR AN ELECTROCHEMICAL CELL

[75] Inventors: Fred J. Berkowitz, Champlin; William G. Howard, Roseville, both of Minn.

[73] Assignee: Medtronic, Inc., Minneapolis, Minn.

[21] Appl. No.: 155,418

[22] Filed: Nov. 19, 1993

[51] Int. Cl.⁶ .................................. H01M 2/26
[52] U.S. Cl. ........................ 429/94; 429/130; 429/211
[58] Field of Search .............. 429/94, 130, 161, 211

[56] References Cited

U.S. PATENT DOCUMENTS

| | | | |
|---|---|---|---|
| 3,343,992 | 9/1967 | Bowers et al. | 429/130 |
| 3,395,043 | 7/1968 | Shoeld . | |
| 3,981,744 | 9/1976 | Greatbatch et al. | 429/178 |
| 3,986,894 | 10/1976 | Ciliberti | 429/153 |
| 4,020,248 | 4/1977 | Goebel | 429/164 |
| 4,032,697 | 6/1977 | Beauchamp et al. | 429/222 |
| 4,255,500 | 3/1981 | Hooke | 429/94 |
| 4,322,484 | 3/1982 | Sugalski | 429/94 |
| 4,324,847 | 4/1982 | Athearn | 429/181 |
| 4,357,398 | 11/1982 | Nelson et al. | 429/94 |
| 4,371,597 | 2/1983 | Ikeda et al. | 429/161 X |
| 4,375,501 | 3/1983 | Peled et al. | 429/94 |
| 4,565,753 | 1/1986 | Goebel et al. | 429/94 |
| 4,767,683 | 8/1988 | Yamada et al. | 429/101 |
| 4,812,376 | 3/1989 | Rudolph | 429/101 |
| 4,830,940 | 5/1989 | Keister et al. | 429/94 X |
| 4,879,190 | 11/1989 | Lundsgaard | 429/94 |
| 4,963,161 | 10/1990 | Chi et al. | 29/623.5 |

Primary Examiner—Stephen Kalafut
Attorney, Agent, or Firm—Daniel W. Latham; Harold R. Patton

[57] ABSTRACT

An isolated, multipoint connection for a coiled electrode electrochemical cell which includes a cathode assembly with a cathode current collector having at least two connector tabs spaced apart on an edge of the current collector and an anode assembly having at least two connector tabs spaced apart on the edge of the anode assembly. Three barriers of nonconductive material are established to isolate the various components; a first nonconductive barrier which isolates the connector tabs from the remainder of the winding; a second nonconductive barrier which isolates the feedthrough and feedthrough pin from the case and from the anode elements; and a third nonconductive barrier established to separate the connections to the cathode connector tabs from the anode elements and from the case.

24 Claims, 6 Drawing Sheets

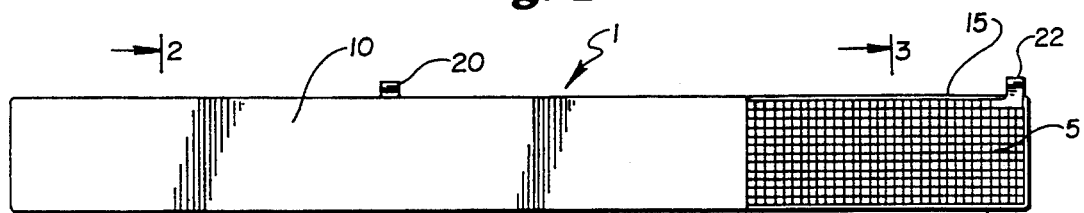
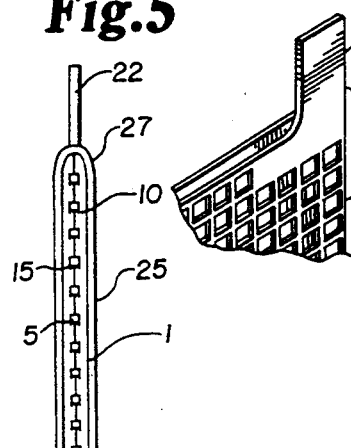
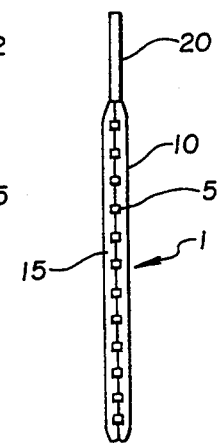
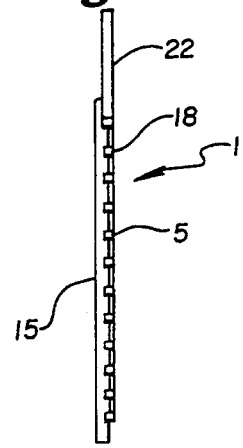
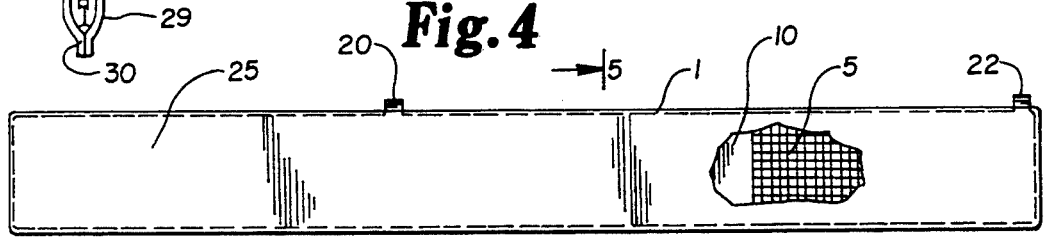
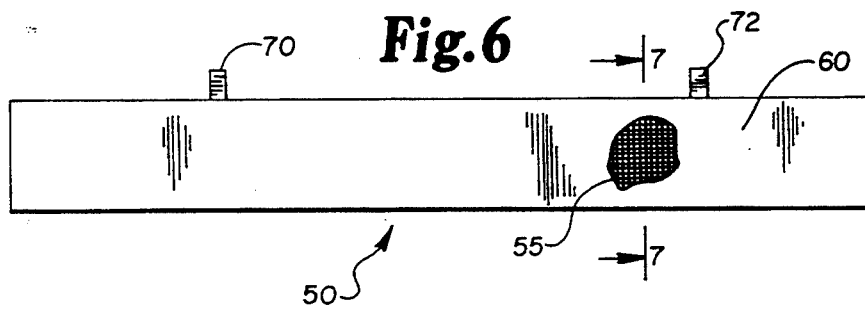
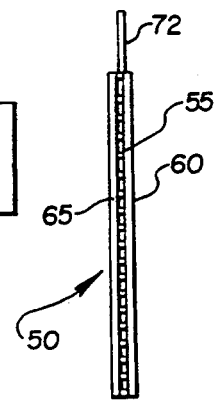

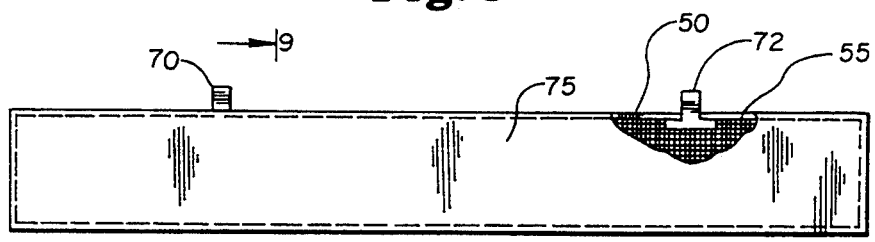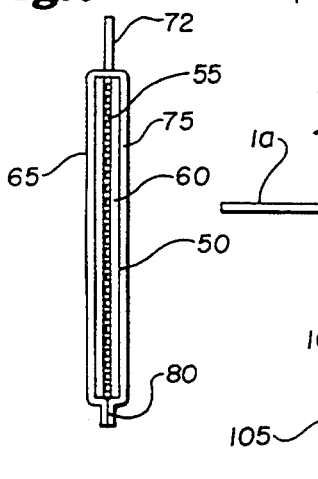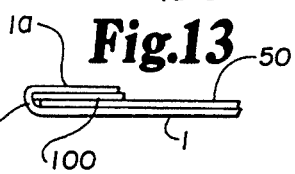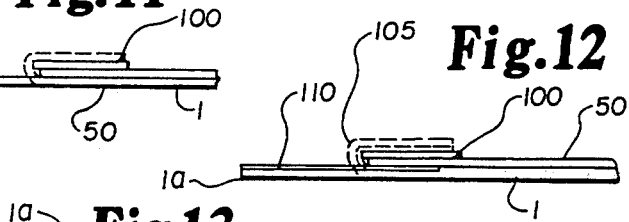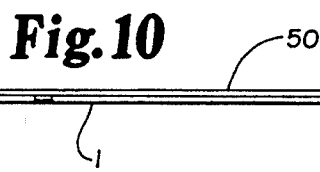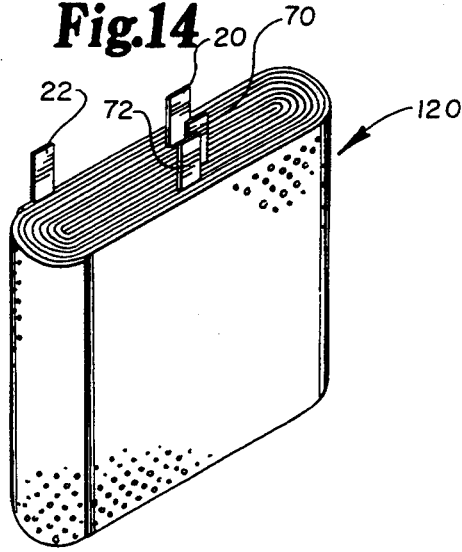

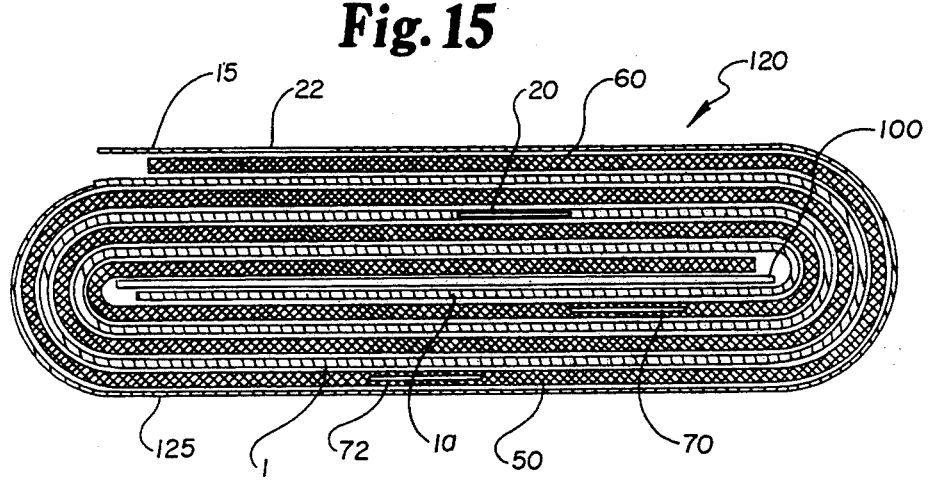
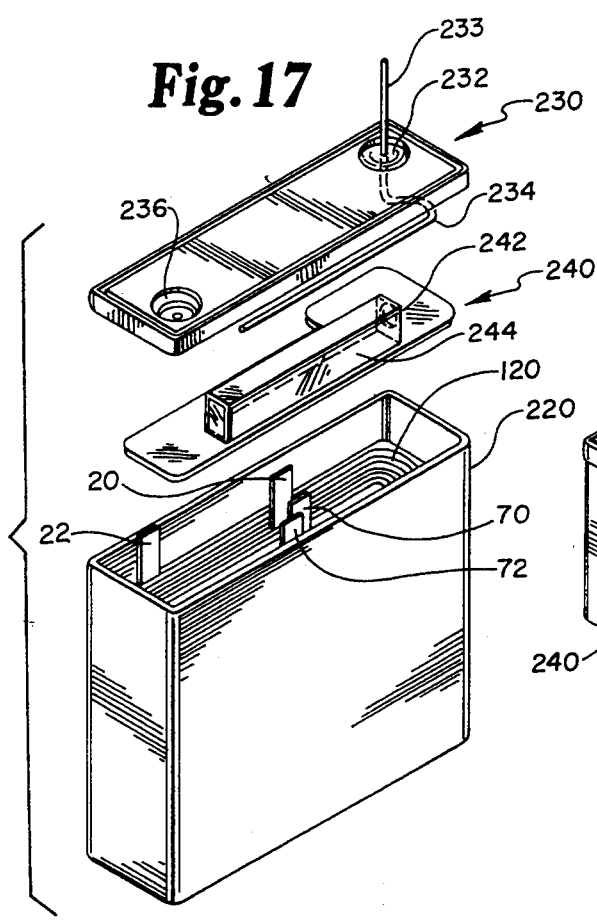
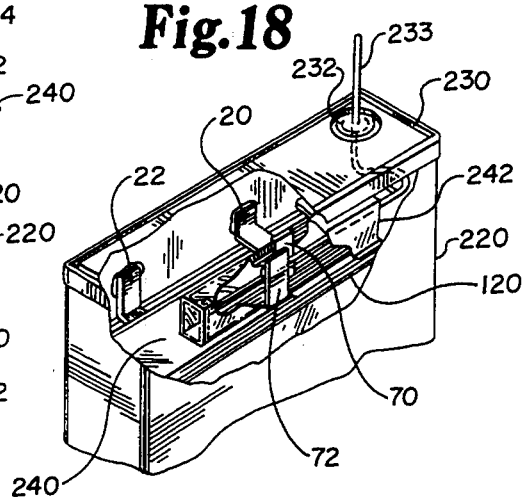

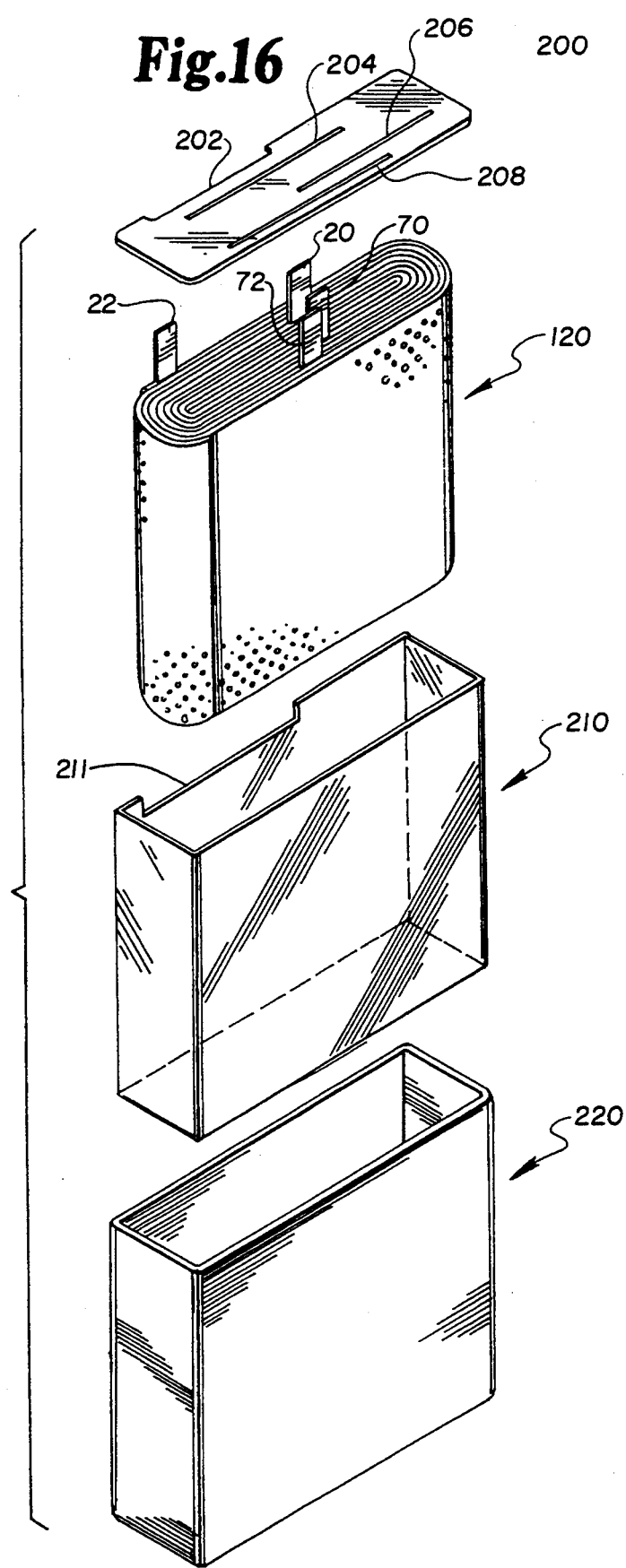

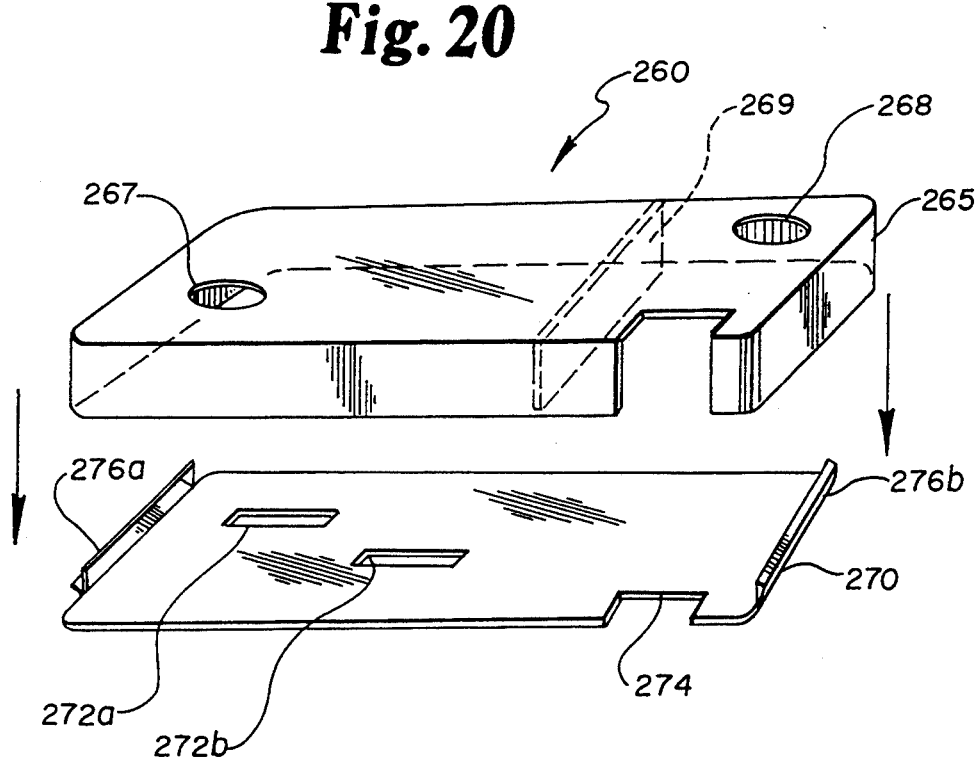

ISOLATED CONNECTION FOR AN ELECTROCHEMICAL CELL

BACKGROUND OF THE INVENTION

This invention relates to electrochemical cells having a lithium anode and more particularly to a primary lithium electrochemical cell adapted for high reliability and high rates of current discharge.

Implantable cardiac defibrillators are used to treat patients suffering from ventricular fibrillation, a chaotic heart rhythm that can quickly result in death if not corrected. In operation, the defibrillator device continuously monitors the electrical activity of the heart of the patient, detects ventricular fibrillation, and in response to that detection, delivers appropriate shocks to restore a normal heart rhythm. Shocks as large as 30–35 joules may be needed. Shocks are delivered from capacitors capable of providing that energy to the patient in a fraction of a second. In order to provide timely therapy to the patient after the detection of ventricular fibrillation, it is necessary to charge the capacitors with the required amount of energy in only a few seconds. Thus, the power source must have a high rate capability to provide the necessary charge to the capacitors, it must also possess low self-discharge in order to have a useful life of many months, and it must be highly reliable to provide an urgently needed therapy whenever necessary. In addition, since cardiac defibrillators are implanted, the battery must be able to supply energy from a minimum packaged volume.

One battery suitable for defibrillator use is disclosed in U.S. Pat. No. 4,830,940 to Keister et al, which patent is incorporated herein by reference. As disclosed therein, the anode material of the battery is lithium and the reactive cathode material is silver vanadium oxide. The anode is constructed in a serpentine-like fashion with cathode plates inserted between each of the convolutions thereof on both sides thereof. The electrolyte for a lithium battery or cell is a liquid organic type which comprises a lithium salt and an organic solvent. Both the anode and the cathode plates are encapsulated in an electrically insulative separator material. However, a disadvantage of this battery design is that the serpentine anode is not efficiently used since anode material at the bends is not faced by cathode material and is therefore not fully utilized. An improvement which addresses this problem is disclosed in U.S. Pat. No. 5,147,737 to Post et al, in which the active material on the serpentine-type electrode is positioned so that the sections of the serpentine-like structure which do not face cathode plates do not contain anode active material. However, the serpentine bends of the anode are still present to the detriment of volumetric efficiency. Additional problems with these battery designs include the number of piece parts and connections required to make the battery which can affect both the manufacturability and the reliability of the battery; and the difficulty of achieving good current distribution and utilization of reactive material due to the unmatched configurations of the anode and cathode.

Conventional lithium batteries can also employ an electrode body in which anode and cathode elements are combined in spiral wound form. A strip sheet of lithium or lithium alloy comprises the anode, a cathode material supported on a charge collecting metal screen comprises the cathode, and a sheet of non-woven material separates the anode and cathode elements. These elements are combined and wound to form a spiral. Typically, the battery configuration for such a wound electrode would be cylindrical. For example, such configurations can be found in U.S. Pat. Nos. 3,373,060; 3,395,043; 3,734,778; 4,000,351; 4,184,012; 4,332,867; 4,333,994; 4,539,271; 4,550,064; 4,663,247; 4,668,320; 4,709,472; 4,863,815; 5,008,165; 5,017,442; and 5,053,297. Unlike the battery of the '940 patent, there need not be anode material which is not mated to cathode material. Such designs therefore have the potential for an improved match between the cathode and anode components and improved uniformity of anode and cathode utilization during discharge. However, cylindrical cells would not achieve the same space utilization inside the case of an implantable defibrillator as a prismatic cell shape.

It has also been known to adapt wound electrodes to a prismatic case configuration by departing from a true spiral winding. For example, U.S. Pat. No. 2,928,888 discloses in FIGS. 5a and 5b therein an oblong electrode assembly wound on an elongated mandrel for use in a rectangular case. Also, for example, U.S. Pat. No. 4,051,304 discloses in FIG. 2 therein another oblong wound electrode assembly for use in a rectangular case. However, these patents do not indicate that such structures could be advantageously used for a high current rate capability lithium battery or that they provide a uniform utilization of reactive anode and cathode material during discharge.

Since a defibrillator may be critical to sustaining the life of the patient, it is essential that the battery used to power it must be reliable. This means that the connections must be very reliable and that in making those connections, that the anode and cathode elements should be isolated from each other to prevent shorting. Further, shorting of the battery due to stray cathode and anode material near the connections is possible and must be prevented. Many methods have been used to provide improved reliability of connections in coiled cells. For example, U.S. Pat. Nos. 4,879,190, 4,322,484 and 4,020,248 show multipoint connection of electrode elements to the battery terminal. However, multipoint attachment can provide additional problems for isolating anode and cathode elements and for prevention of migration of cathode and anode materials.

It is therefore an object of the present invention to provide a lithium battery having a coiled electrode with high reliability multipoint attachments between the electrodes and the terminals.

It is also an object of the present invention to provide a lithium battery having a coiled electrode which provides a high degree of isolation between anode and cathode elements.

SUMMARY OF THE INVENTION

These and other objects are accomplished by the electrochemical cell and electrode assembly of the present invention. We have discovered an isolated, multipoint connection for a coiled electrode electrochemical cell which includes a cathode assembly with a cathode current collector having at least two connector tabs spaced apart on an edge of the cathode assembly and an anode assembly having at least one connector tab on the edge of the anode assembly. The anode and cathode are wound together such that the anode and cathode connector tabs are on the same end of the winding and yet the cathode connector tabs are aligned on one side of the winding and the anode connector tab is on a second side of the winding.

Three barriers of nonconductive material are established to isolate the various components. A coil insulator having openings to accommodate the anode and cathode connector tabs is positioned over the end of the winding with the anode and cathode connector tabs projecting through it, thereby providing a first nonconductive barrier which isolates the connector tabs from the winding. A feedthrough with a single feedthrough pin is positioned to connect with both cathode connector tabs and is welded to both connector tabs. The glass seal of the feedthrough is insulated and the feedthrough pin is insulated between the glass seal and the first weld thereby providing a second nonconductive barrier which isolates the feedthrough and feedthrough pin from the case and from the anode connector tab. In the vicinity of the welds, a third nonconductive barrier is established to separate the connections to the cathode connector tabs from the anode connector tab and from the case. The insulated portion of the feedthrough pin passes through an aperture in the third nonconductive barrier, thereby completely isolating the cathode connections from the case and from the anode connector tab.

In addition to the three principal barriers identified above, an insulative case liner can be used for the metal case holding the battery winding to insulate the case from the winding. This case liner can cooperate with the three principal barriers to provide additional isolation from the case body by building in overlap between the pin insulator and the coil insulator. Also cooperating with the three principal barriers is a cover insulator adapted to fit under the case cover which holds the feedthrough to further insulate the feedthrough and feedthrough pin from the case.

BRIEF DESCRIPTION OF THE DRAWINGS

FIG. 1 is a side view of an anode component used in the present invention.

FIG. 2 is a cross sectional view of a first portion of the anode of FIG. 1.

FIG. 3 is a cross sectional view of a second portion of the anode of FIG. 1.

FIG. 3A is a detail view of the electrode tab of the anode of FIG. 1.

FIG. 4 is a partially cut-away side view of the combined anode and separator used in the present invention.

FIG. 5 is a a is a cross sectional view of the anode and separator of FIG. 4.

FIG. 6 is a partially cut-away side view of the cathode assembly used in the present invention.

FIG. 7 is a cross sectional view of the cathode assembly of FIG. 6.

FIG. 8 is a partially cut-away side view of the combined cathode assembly and separator used in the present invention.

FIG. 9 is a cross sectional view of the combined cathode assembly and separator of FIG. 8.

FIG. 10 is a top view of the mandrel, cathode assembly and anode assembly ready to be wound.

FIG. 11 is a top view of the end portion of the mandrel, cathode assembly and anode assembly of FIG. 10 showing the direction of the bend for the anode about the cathode and mandrel.

FIG. 12 is a top view of the end portion of the mandrel, cathode assembly and anode assembly of FIG. 11 showing the use of additional separator material at the anode bend.

FIG. 13 is a top view of the end portion of the mandrel, cathode assembly and anode assembly showing the completed bend from FIG. 11.

FIG. 14 is a perspective view of the completed electrode assembly according to the present invention.

FIG. 15 is a top view of the windings of the electrode assembly (not showing the separator material between the winding elements) and the position of the mandrel in the windings prior to its removal.

FIG. 16 is an exploded perspective view showing the insertion of the electrode assembly into the battery case together with insulator materials.

FIG. 17 is an exploded perspective view showing the application of the insulator and case top to the case and electrode assembly of FIG. 16.

FIG. 18 is a partial cut-away perspective view of the completed battery showing the connection of the tabs of the electrode with the case elements.

FIG. 20 is a perspective view of an alternative form for isolation components for the battery.

DETAILED DESCRIPTION OF THE INVENTION

Figure 19:
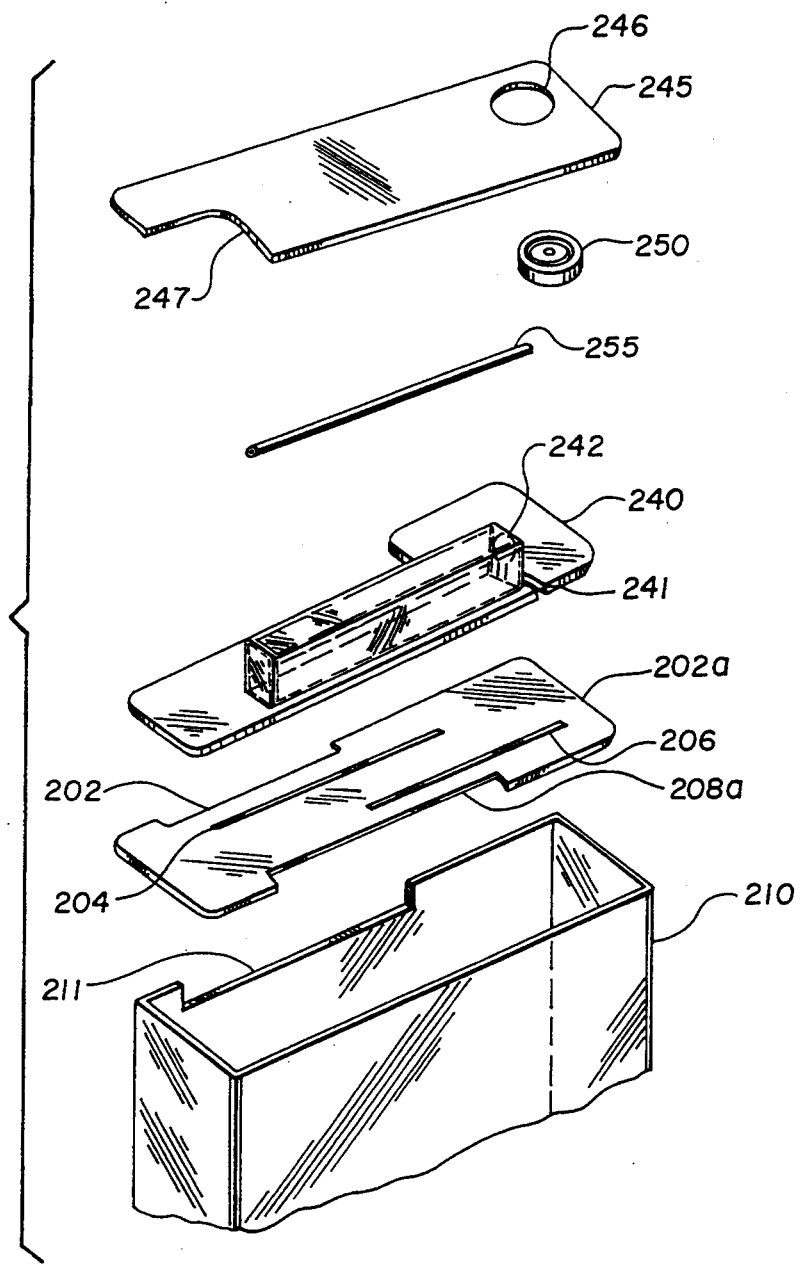
FIG. 19 is a partial cut-away perspective view of the isolation components for the battery.

Referring now to the drawings, FIGS. 1-6 show the anode portion of the electrode assembly. In FIG. 1, the elongated anode assembly 1 is shown including a current collector 5 which has a first layer of alkali metal 10 on one side and a second layer of alkali metal 15 on the other side. The alkali metal 10, 15 is preferably lithium metal or an alloy of lithium pressed onto the screen current collector 5. FIG. 2 shows in cross section the sandwich structure of the anode assembly 1 with the current collector 5 interposed between the first and second layers of alkali metal 10, 15. FIG. 3 shows in cross section that the anode assembly 1 has at one end 18 only alkali metal 15 on one side of the current collector 5. The bare portion of the current collector 5 will form the outer wrap of the wound electrode assembly since no active material is required for that surface. The current collector 5 is a conductive metal that is corrosion-resistant when associated with the alkali metal 10, 15, preferably nickel, copper or an alloy of nickel or copper. First and second connector tabs 20, 22 project from the edge of the current collector although a single connector tab may also be used since the conductivity of lithium metal on a nickel or copper current collector is capable of providing adequate current distribution at high discharge rates if the current collector has an adequate conductive cross sectional area for its length. Additional connector tabs may also be added if improved reliability of connections is desired. The connector tabs 20, 22 can be incorporated into the current collector 5 when formed as shown in FIG. 3A. The current collector 5 is preferably made by an etching process which provides smooth edges on the current collector 5 and thereby eliminates stray metal pieces which may otherwise poke through the separator material and cause shorting of the battery. An alternative to the anode assembly 1 depicted is to dispense with the current collector 5 in favor of an anode which is made up almost entirely of an alkali metal or alkali metal alloy. In such a configuration, the alkali metal would be formed in a thicker cross-section at one end than at another and the connector tabs would be connected directly to the alkali metal.

FIGS. 5 and 6 show the anode assembly 1 covered by separator 25. Separator 25 forms a pocket around the anode assembly 1 since it folds over at the top edge 27 and conforms to the anode assembly 1 until it reaches the bottom edge 29 where it is joined to itself at a seal 30. Slits (not shown) can be cut in the separator 25 to allow the connector tabs 20, 22 to project through the separator 25. The material used in the separator 25 can be a commercially available microporous polyolefin (i.e. polyethylene or polypropylene) separator material such as Celgard 4560 (a microporous/nonwoven laminate material made by Hoechst Celanese). Preferably, the nonwoven side of separator 25 is pressed into the surface of the alkali metal 10, 15 of the anode assembly 1 such that the alkali metal deforms into intimate contact with the separator 25 and bonds to the separator 25.

This deformation bonding can be accomplished by pressing the nonwoven side of separator 25 onto the alkali metal 10, 15 in a hydraulic press. It can be accomplished in the same pressing operation in which the alkali metal 10, 15 is pressed onto the current collector 5 as described above. In preparation for the pressing operation, the alkali metal 10, 15 sheets are cut to size, weighed and placed on either side of the current collector 5 in a die. The die and the anode components 5, 10, 15 are then placed in a rolling fixture which presses the alkali metal 10, 15 onto the current collector at a pressure sufficient to hold them in place. The separator 25 is then placed around the anode assembly 1 and is pressed onto the alkali metal 10, 15 on the anode assembly 1 by a hydraulic press at a pressure that deforms the anode metal into intimate contact with the separator. For example, about 400 psi could be used.

The seal 30 for the separator can be a heat seal made by conventional heat sealing equipment.

Referring now to FIGS. 6–9 which show the elongated cathode assembly 50, the cathode assembly 50 includes a current collector 55 onto which layers 60, 65 of a cathode material are pressed. The cathode assembly 50 has essentially the same width as the anode assembly 1. The cathode material includes a solid reactive cathode ingredient such as manganese dioxide, $V_6O_{13}$, silver vanadium oxide, or $CF_x$ and dry mixtures including such materials together with such binders and conductivity enhancers as may be desirable. Preferably, the silver vanadium oxide used is that disclosed in U.S. Pat. No. 5,221,453 issued to Crespi. For example, in a battery employing silver vanadium oxide as a reactive cathode ingredient, about 5% PTFE could be added as a binder along with about 2% carbon black and 2% graphite as conductivity enhancers. The particulate ingredients can be mixed together, dried to a desired moisture content, placed in a uniform layer over the current collector 55 and then dry pressed in a high pressure press to form each of the cathode material layers 60, 65. Alternatively, wet processes known in the art could also be used in which a wet mix of cathode material is deposited on the current collector 55 and then dried and rolled to form each of the cathode material layers 60, 65. Connector tabs 70, 72 project from the edge of the current collector 55 in substantially the same manner as in the anode assembly 1 described above. The current collector 55 is a conductive metal that is corrosion-resistant when associated with the cathode material, preferably titanium, stainless steel or an alloy of titanium. A separator 75 forms a pocket around the cathode assembly 50 in the same manner as that for the anode assembly 1 above and is provided with a seal 80. The material used in the separator 75 can be the same commercially available microporous polyolefin (i.e. polyethylene or polypropylene) separator material as is used for the anode assembly 1 and the seal 80 can be a heat seal of the material. Preferably, the separator 75 for the cathode assembly 50 is made slightly larger than the cathode assembly to allow for swelling of the cathode material 60, 65 as the battery is discharged and to keep it from splitting as the battery is discharged. This is in contrast with the separator 25 for the anode assembly 1 which can be tightly fitting around the anode assembly 1.

FIGS. 10–13 indicate how the winding process is to be started. FIG. 10 shows the anode assembly 1 which has been aligned with the cathode assembly 50 and the mandrel 100 in order to commence the winding operation. The separators 25, 75 for these components are in place around the anode assembly 1 and the cathode assembly 50 respectively during the winding operation although they are not shown. It should be noted that the anode assembly 1 is longer than the cathode assembly 50 and has been positioned at one end 1a to overlap the corresponding end 50a of the cathode assembly 50. The end 50a of the cathode assembly 50 has been positioned slightly behind the edge 100a of the mandrel 100. The anode assembly 1 has also been placed against the cathode assembly 50 such that the alkali metal layer 15 is against cathode material layer 60 at the end 18 of the anode assembly 1. This will ensure that the outer winding of the electrode assembly has an alkali metal layer 15 facing the cathode material 60 and the bare current collector 5 at the end 18 will face outward. As shown in FIGS. 11 and 13, the winding process is commenced by bending end 1a of the anode assembly 1 onto the mandrel 100. As shown, the bend 105 also bends the anode assembly 1 around the end of the cathode assembly. A minor alternative (not shown) to this bending procedure that may be useful when making the bend by hand is to first bend the anode assembly 1 over the mandrel 100 in the absence of the cathode assembly 50 (but including a spacer of equivalent thickness to the cathode assembly 50 to make the proper bend radius on the anode assembly 1) and then to remove the spacer and slip the cathode assembly 50 between the mandrel 100 and the anode assembly.

It may be desirable to place additional separator material between the anode assembly 1 and the cathode assembly 50 and between the anode assembly and the mandrel 100 to provide smoother bends. This can be accomplished as shown in FIG. 12 where additional separator material 110 has been placed over the anode assembly 1 and between the anode assembly 1 and cathode assembly 50 at the point where the bend 105 is to be made. A most convenient method for adding the additional separator material 110 is to merely make a longer separator 25 and extend the separator 25 for the anode assembly 1 beyond the length of the anode assembly 1 at the appropriate end 1a and to simply fold the separator back along the anode assembly 1, thus providing a triple thickness of separator material at the point of the bend 105.

The winding then proceeds by winding the combined anode assembly 1 and cathode assembly 50 around the mandrel unidirectionally until the electrode assembly is completed. It is essential that the winding process be carried out by a method which will result in consistent winding tension. Uneven winding tension can cause higher and lower resistance paths during discharge which produces uneven current distribution and can alter the location of the connector tabs 20, 22, 70 and 72 in the final winding which can make connections difficult. Even winding tension can be accomplished by careful hand winding or by machine winding. Machine winding, which can produce greater battery-to-battery uniformity is preferred. FIG. 14 shows the completed electrode assembly 120 with connector tabs 20, 22, 70 and 72 projecting from the electrode assembly 120. Preferably, the connector tabs 20, 22 associated with the anode are on one side of the electrode assembly 120 while the connector tabs 70, 72 associated with the cathode are spaced apart from the anode connector tabs 20, 22 on the opposite side of the electrode assembly as shown. This helps to avoid inadvertent shorts in the completed battery. Also, preferably, the connector tabs are located such that they are positioned close to their intended connection point with the feedthrough or case and with no overlap between the cathode tabs or between the anode tabs in order to facilitate making the individual welded connections.

FIG. 15 shows the final arrangement of the windings in the electrode assembly 120 together with the mandrel 100 (the separators 25, 75 and current collectors 5, 55 are not shown). Consistent winding of the anode assembly 1 and the cathode assembly 50 will result in an electrode assembly 120 in which the mandrel 100 determines the length of the straight sides of the electrode assembly 120 and in which the final anode layer 125 has alkali metal 15 only facing the cathode material 60. As described above, if the current collector 5 is eliminated in the design, then the final anode layer 125 is simply made of anode material at half of the thickness of the rest of the anode.

Removal of the mandrel 100 will bring the first end 1a of the anode assembly 1 into contact on both sides with the cathode assembly 50 and will complete the electrode assembly 120. It will be appreciated that in order to provide close proximity between anode assembly 1 and cathode assembly 50 at the start of the winding, that the mandrel should be very thin. For example, a stainless steel mandrel about 0.010 inch thick could be used although thicker mandrels could be used if additional stiffness were required.

As will be appreciated by those skilled in the art, the number of windings chosen for the battery will be determined by the required rate of discharge and the required capacity of the battery. Increasing the number of windings will provide an increased ability to discharge at a high rate but will tend to reduce the capacity per unit volume for the battery.

Assembly of the electrode assembly 120 into a battery is shown in FIGS. 16–18. In FIG. 16, a coil insulator 200 is placed onto the electrode assembly 120. The coil insulator includes a notch 202 to accommodate anode connector tab 22 and slits 204, 206, 208 to accommodate anode connector tab 20, and cathode connector tabs 70, 72 respectively. The electrode assembly 120 is also inserted into an insulative case liner 210. The case liner 210 preferably extends at its top edge above the edge of the electrode assembly 120 in order to provide an overlap with other insulative elements. If so, it may include a notch 211 on one side in order to allow the easy connection of the anode connector tabs 20, 22 to the case 220. The coil insulator 200 and case liner 210 are preferably made from a polyolefin polymer or a fluoropolymer such as ETFE or ECTFE. The electrode assembly 120 and case liner 210 are then inserted into a prismatic case 220, preferably made of stainless steel. In FIG. 17 a case cover 230 and a pin insulator 240 are shown along with the electrode assembly 120 and prismatic case 220. The case cover 230 has a glassed in feedthrough 232 and feedthrough pin 233 extending through an aperture in the case cover 230 that has a bend 234 which is intended to place the feedthrough 232 in alignment with the cathode connector tabs 70, 72. The case cover 230 also has a fill port 236. The case cover 230 is made from stainless steel and the feedthrough pin 233 is preferably niobium or molybdenum. The pin insulator 240 has an aperture 242 leading into a raised portion 244 which receives the feedthrough pin 233 and insulates the feedthrough pin 233 from contact with the case cover 230. In combination with one side of the coil insulator 200, which is immediately below the pin insulator 240, the raised portion forms a chamber which isolates the cathode connections. Additional insulation in the form of tubing or a coating (not shown) may also be included on the feedthrough pin 233 and feedthrough 232 at locations which will not be welded to further insulate the feedthrough pin 233 and feedthrough 232 and also an additional cover insulator (not shown) could be applied to the underside of the case cover 230 to provide additional insulation for the case cover 230. The feedthrough pin 233 is welded to the cathode connector tabs 70, 72 as shown in FIG. 18 and the anode connector tabs 20, 22 are bent into an "L" shape as shown in FIG. 18 and are welded to the side of the case 220 thereby making the metal case 220 one terminal or contact for the battery (i.e. a case negative design). The feedthrough pin 233 is then inserted through a split (not shown) in the pin insulator 240 until it projects through the aperture 242 of the pin insulator 240. The electrode assembly 120 may be out of the case 220 during some of the welding and bending operations. All electrode welding operations should take place in an inert gas atmosphere. The case cover 230 is then welded to the case 220 to seal the electrode assembly 120 in the case.

Referring now also to FIG. 19, the isolation components for the battery are shown in greater detail. A cover insulator 245 is adapted to fit under the case cover 230 with an aperture 246 to accommodate the feedthrough 232 and feedthrough pin 233 and a cutaway portion 247 to accommodate the fill port 236. The cover insulator 245 is applied to the underside of the case cover 230. A feedthrough insulator 250 then slides over the feedthrough pin 233 and over the feedthrough 232 into contact with the cover insulator 245. Once the feedthrough insulator 250 is in place, a tubular insulator 255 is slipped over the feedthrough pin 233 until it contacts the glass of the feedthrough 232. The feedthrough pin 233 is then bent into its desired configuration for connection with cathode connector tabs 70, 72 as shown in FIG. 17. The pin insulator 240 is shown with a split 241 which extends from the edge of the pin insulator 240 to the aperture 242. Again, the pin insulator 240 has an aperture 242 leading into a raised portion 244 or recess which receives the feedthrough pin 233 and the tubular insulator 255 over the feedthrough pin and insulates the feedthrough pin 233 from contact with the case cover 230 at the point where the feedthrough pin is welded to the cathode connector tabs 70, 72. The split 241 allows the pin insulator 240 to be placed on the feedthrough pin 233 after the feedthrough pin has been welded to the cathode tabs 70, 72. The tubular insulator 255 therefore extends through the aperture 242, thereby preventing any discontinuity in the isolation of the cathode connector tabs 70, 72 and feedthrough pin 233 from elements at anode potential. A coil insulator 202a is shown with a notch 202 to accommodate anode connector tab 22 and slits 204, 206 to accommodate anode connector tab 20, and cathode connector tab 70 respectively. A notch 208a is also provided to accommodate cathode connector tab 72 in place of the slit 208 shown in FIG. 16. The electrode assembly 120 is also inserted into an insulative case liner 210. All of the case isolation components including the cover insulator 245, the feedthrough insulator 250, the tubular insulator 255, the pin insulator 240, the coil insulator 202a and the case liner 210 are molded or extruded self-supporting polymeric parts preferably made from a polyolefin polymer or a fluoropolymer such as ETFE or ECTFE. The result of this insulator configuration is that the cathode connections are thoroughly isolated from the portions of the battery at anode potential and that the feedthrough connection is thoroughly isolated from stray particles of material from the cathode and from lithium particles that may form during discharge of the battery. It will be appreciated that additional improvements to this insulator configuration can be achieved by improving the fit between insulative components to provide better isolation of anode and cathode elements. For example, the aperture 242 on the pin insulator 240 and the tubular insulator 255 could be sized to be tightly fitting components or the feedthrough pin 233 could be fitted with mating insulator parts that would provide a snap fit which would obviate any migration of stray battery materials through the aperture 242. Alternative configurations of this type can be similar to that shown in FIG. 20. In FIG. 20, a snap fit isolation system 260 is shown which can reduce the number of isolation components in the battery. The snap fit isolation system 260 can consist of two principal components, a top component 265 and a bottom component 270, both components 265, 270 made from insulative plastic material by injection molding. These components 265, 270 can be used to replace components 202a, 240 and, optionally, 245 shown in FIG. 19. The bottom component 270 includes apertures 272a and 272b which can accommodate two cathode connector tabs and a notch 274 which can accommodate an anode connector tab and also provide a passageway from the fill port 236 into the remainder of the battery case to facilitate filling of the battery with electrolyte. Also shown are hooks 276a, 276b which are adapted to mate with the top component 265 to make a secure snap fit between the top component 265 and bottom component 270. Many other structures for making a secure snap fit between components 265, 270 could also be used. Such structures are well known for molded plastic parts. In addition, one of such hooks 276a, 276b could be omitted in favor of a molded hinge which would join one edge of each of the components 265, 270. The top component 265 includes a first aperture 267 adapted to accommodate the feedthrough pin 233 and a second aperture 268 aligned with the fill port 236 in order to allow the electrolyte to fill the battery through the fill port 236. The top component 265 also includes a partition wall 269 which, when the top and bottom components 265, 270 are joined, will separate the cathode connections and the feedthrough pin 233 from the fill port 236 and anode connection (only one anode tab would be used to connect the anode with the case in the embodiment shown) and also isolate the cathode connections and feedthrough pin 233 from other battery components. In essence, by joining the two components 265, 270, a separate compartment is created to house the feedthrough pin 233 and its connections with the cathode tabs.

Alternative embodiments in which the battery is a case positive design or case neutral design can readily be constructed in a like manner. For a case positive design, the cathode connector tabs 70, 72 can be rearranged to be welded to the case 220 while the anode connector tabs 20, 22 can be rearranged to be welded to the feedthrough pin 233. For a case neutral design, an additional feedthrough can be supplied that is connected to the anode connector tabs 20, 22.

An alternative embodiment can also be readily constructed by exchanging the relative positions of the cathode and anode materials. This reverses the electrode assembly construction so that the cathode assembly is made longer than the anode assembly with a portion of the current collector only having cathode material on one side to make up the outer layer of the winding and so that the winding is initiated by bending the cathode assembly over the mandrel. However, the embodiment described in greater detail above is preferred due to better rate capability and volumetric efficiency.

An appropriate electrolyte solution is introduced through the fill port 236 by a vacuum filling process and the fill port 236 is then sealed. The electrolyte solution can be a alkali metal salt in an organic solvent such as a lithium salt (i.e. 1.0M $LiClO_4$ or $LiAsF_6$) in a 50/50 mixture of propylene carbonate and dimethoxyethane. The sealing process (not shown) may include, for example, making a first seal by pressing a plug into the aperture of the fill port 236 and making a second seal by welding a cap or disc over the fill port 236. Material utilized for leak checking hermetic seals may be included between the first and second seals.

It will be appreciated by those skilled in the art that while the invention has been described above in connection with particular embodiments and examples, the invention is not necessarily so limited and that numerous other embodiments, examples, uses, modifications and departures from the embodiments, examples and uses may be made without departing from the inventive concepts.

We claim:

1. An isolated, multipoint connection for a coiled electrode electrochemical cell comprising:
   (a) a case;
   (b) a feedthrough extending through an aperture in the case, the feedthrough having a seal and a pin extending through the seal;
   (c) a cathode assembly having at least two connector tabs spaced apart on an edge of the cathode assembly;
   (d) an anode assembly having at least one connector tab on the edge of the anode assembly; the anode and cathode wound together with the cathode connector tabs aligned on a first side of the winding and the anode connector tab on a second side of the winding, the cathode connector tabs connected to the feedthrough pin and the anode connector tab connected to the case;
   (e) a first nonconductive barrier which isolates the connector tabs from the winding by having each of the connector tabs project through the barrier by means of individual apertures through the barrier;

(d) a second nonconductive barrier which isolates the feedthrough and feedthrough pin from the case and from the anode connector tab; and (e) a third nonconductive barrier which isolates the connections between the feedthrough pin and the cathode connector tabs from the anode connector tab and from the case.

2. A connection according to claim 1 wherein the first nonconductive barrier includes perforations through which the connector tabs protrude.

3. A connection according to claim 2 wherein the perforations are slots which allow connector tab position on the winding to be varied.

4. A connection according to claim 1 wherein the feedthrough is connected to the cathode connector tabs by welding.

5. A connection according to claim 1 wherein the second nonconductive barrier has an aperture through which the feedthrough pin extends and cooperates with the third nonconductive barrier to prevent discontinuities in the isolation of the cathode connector tabs and feedthrough pin.

6. A connection according to claim 1 wherein the third nonconductive barrier has a recessed portion which accommodates the connections between the cathode connector tabs and the feedthrough pin.

7. A connection according to claim 6 wherein the third nonconductive barrier cooperates with the first nonconductive barrier to provide a chamber which is bounded by the recessed portion and a side of the first nonconductive barrier.

8. A connection according to claim 1 wherein the first, second and third nonconductive barriers are made from a self-supporting polymeric material.

9. A connection according to claim 8 wherein the polymeric material is selected from the group consisting of polyolefins and fluoropolymers.

10. A connection according to claim 1 also comprising an insulative case liner cooperating with the first nonconductive barrier to isolate the winding and cathode connector tabs from the case.

11. A connection according to claim 1 wherein the case also comprises a case cover through which the feedthrough extends.

12. A connection according to claim 11 also comprising a cover insulator adapted to fit under the case cover and cooperating with the second nonconductive barrier to insulate the feedthrough and feedthrough pin from the case.

13. An isolated, multipoint connection for a coiled electrode electrochemical cell comprising:
(a) a case;
(b) a feedthrough extending through an aperture in the case, the feedthrough having a seal and a pin extending through the seal;
(c) an anode assembly having at least two connector tabs spaced apart on an edge of the anode assembly;
(d) an cathode assembly having at least one connector tab on the edge of the cathode assembly; the anode and cathode wound together with the anode connector tabs aligned on a first side of the winding and the cathode connector tab on a second side of the winding, the anode connector tabs connected to the feedthrough pin and the cathode connector tab connected to the case;

(e) a first nonconductive barrier which isolates the connector tabs from the winding by having each of the connector tabs project through the barrier by means of individual apertures through the barrier;

(d) a second nonconductive barrier which isolates the feedthrough and feedthrough pin from the case and from the cathode connector tab; and (e) a third nonconductive barrier which isolates the connections between the feedthrough pin and the anode connector tabs from the cathode connector tab and from the case.

14. A connection according to claim 13 wherein the first nonconductive barrier includes perforations through which the connector tabs protrude.

15. A connection according to claim 14 wherein the perforations are slots which allow connector tab position on the winding to be varied.

16. A connection according to claim 13 wherein the feedthrough is connected to the cathode connector tabs by welding.

17. A connection according to claim 13 wherein the second nonconductive barrier has an aperture through which the feedthrough pin extends and cooperates with the third nonconductive barrier to prevent discontinuities in the isolation of the anode connector tabs and feedthrough pin.

18. A connection according to claim 13 wherein the third nonconductive barrier has a recessed portion which accommodates the connections between the anode connector tabs and the feedthrough pin.

19. A connection according to claim 18 wherein the third nonconductive barrier cooperates with the first nonconductive barrier to provide a chamber which is bounded by the recessed portion and a side of the first nonconductive barrier.

20. A connection according to claim 13 wherein the first, second and third nonconductive barriers are made from a self-supporting polymeric material.

21. A connection according to claim 20 wherein the polymeric material is selected from the group consisting of polyolefins and fluoropolymers.

22. A connection according to claim 13 also comprising an insulative case liner cooperating with the first nonconductive barrier to isolate the winding and anode connector tabs from the case.

23. A connection according to claim 13 wherein the case also comprises a case cover through which the feedthrough extends.

24. A connection according to claim 23 also comprising a cover insulator adapted to fit under the case cover and cooperating with the second nonconductive barrier to insulate the feedthrough and feedthrough pin from the case.

* * * * *